(12) United States Patent
Sasauchi et al.

(10) Patent No.: US 8,840,826 B2
(45) Date of Patent: *Sep. 23, 2014

(54) METHOD OF MAKING MULTILAYER CONTAINER

(75) Inventors: Katsuro Sasauchi, Osaka (JP); Jun Kawata, Osaka (JP)

(73) Assignee: Nakamoto Packs Co., Ltd., Osaka (JP)

( * ) Notice: Subject to any disclaimer, the term of this patent is extended or adjusted under 35 U.S.C. 154(b) by 221 days.

This patent is subject to a terminal disclaimer.

(21) Appl. No.: 13/040,001

(22) Filed: Mar. 3, 2011

(65) Prior Publication Data

US 2012/0223458 A1    Sep. 6, 2012

(51) Int. Cl.
| | |
|---|---|
| *B29C 51/04* | (2006.01) |
| *B29C 51/14* | (2006.01) |
| *B29C 51/00* | (2006.01) |
| *B65D 1/28* | (2006.01) |
| *B29C 51/06* | (2006.01) |
| *B29C 51/02* | (2006.01) |
| *B32B 27/08* | (2006.01) |
| *B29L 31/00* | (2006.01) |

(52) U.S. Cl.
CPC ............... *B29C 51/002* (2013.01); *B65D 1/28* (2013.01); *B29C 51/06* (2013.01); *B29C 51/02* (2013.01); *B29C 51/14* (2013.01); *B32B 27/08* (2013.01); *B32B 2439/70* (2013.01); *B29L 2031/712* (2013.01); *B29C 51/04* (2013.01)
USPC ........ 264/292; 264/241; 264/288.4; 264/346; 428/36.7

(58) Field of Classification Search
None
See application file for complete search history.

(56) References Cited

U.S. PATENT DOCUMENTS

| | | | | |
|---|---|---|---|---|
| 3,429,854 | A | * | 2/1969 | Rein et al. ............... 264/547 |
| 3,496,143 | A | | 2/1970 | Siggel et al. |
| 6,037,063 | A | * | 3/2000 | Muschiatti et al. ........... 428/480 |
| 7,237,371 | B2 | * | 7/2007 | Yamamoto et al. ............. 53/433 |
| 8,163,217 | B2 | * | 4/2012 | Takaoka et al. ............. 264/235.6 |
| 2008/0042318 | A1 | * | 2/2008 | Takaoka et al. ............... 264/291 |

FOREIGN PATENT DOCUMENTS

| | | |
|---|---|---|
| EP | 0 928 683 A2 | 7/1999 |
| EP | 1 752 286 A1 | 2/2007 |
| EP | 1 870 226 A2 | 12/2007 |
| EP | 2 123 425 A1 | 11/2009 |

OTHER PUBLICATIONS

Extended European search report dated Mar. 5, 2012 issued in European patent application No. 11157153.5.

* cited by examiner

*Primary Examiner* — Christina Johnson
*Assistant Examiner* — David Schmerfeld
(74) *Attorney, Agent, or Firm* — Birch, Stewart, Kolasch & Birch, LLP

(57) ABSTRACT

This invention relates to a method of making a multilayer container which comprises:
  a primary stretching and heat-setting process wherein a multilayer sheet comprising a A-PET layer, a functional resin layer and a sealant layer, is heated, primarily stretched and then primarily heat-set, and
  a secondary stretching and heat-setting process wherein the multilayer sheet treated in the primary stretching and heat-setting process is molded with heating by a mold of a thermoforming machine while secondary stretching is performed, followed by secondary heat-setting in the same mold.

4 Claims, 2 Drawing Sheets

METHOD OF MAKING MULTILAYER CONTAINER

FIELD OF THE INVENTION

This invention relates to multilayer containers, especially food containers for convenience stores etc., wherein food is placed therein and sold, and more particularly, relates to the multilayer containers having excellent functional characteristics, such as heat-resistance capable of resisting from distribution temperature under refrigerated conditions to retort sterilization temperature of 125° C., dropping resistance and keeping quality of foods.

BACKGROUND OF THE INVENTION

In food shops in convenience stores, department stores, super markets, etc., foods, such as boiled rice, daily dishes, noodles, salads and processed meat, e.g., ham are placed in food containers, e.g., tray, cup or bowl, and sold. Such a food container is composed of a container body and a cover. The container body is, in general, manufactured by thermoforming a sheet of polypropylene, foamed polypropylene, filler-containing polypropylene, polyethylene, foamed polyethylene, formed polystyrene, foamed heat-resistant polystyrene, amorphous polyethylene terephthalate (A-PET), etc, by a vacuum forming machine, a pressure forming machine or a vacuum-pressure forming machine. The cover is formed from a sheet, such as A-PET, biaxially oriented polystyrene (OPS) or polypropylene (PP) (JP2005-329972A).

Recently, it is frequently conducted that foods packaged in a food container are heated as it is by a microwave oven. When foods are heated together with the food container by a microwave oven, temperature of the foods is raised to around 100° C. Accordingly, food containers are required to have a heat resistance resisting up to around 100° C. Food containers for retort foods are required to resist a retort sterilization temperature at 125° C. Furthermore, food containers are desirably to have high transparency so that the foods packaged therein can be appreciated clearly at a look and can improve commercial value.

However, none of the above-mentioned conventional sheets satisfies both of high heat resistance and high transparency. That is, A-PET and OPS have high transparency, but have not high heat resistance and are softened at around 70° C. PP sheet has high heat resistance but is inferior in transparency.

Thereupon, the applicant devised a method of making a heat-resistant transparent container which comprises a primary stretching and heat-setting process wherein an amorphous polyethylene terephthalate sheet is heated, primarily stretched and then primarily heat-set, and a secondary stretching and heat-setting process wherein the sheet treated in the primary stretching and heat-setting process is molded with heating in a mold of a thermoforming machine while secondary stretching is performed followed by secondary heat-setting in the same mold (JP 4223520 B2, EP 1870226 A2).

In the meantime, daily delivering foods having use-by date within 2 days, cold-storage foods having relatively long-term use-by date, retort foods having long-term use-by date, and the like are sold in food shops in convenience stores and super markets, and food containers are required to have an ability to keep quality of foods corresponding to the use-by date.

However, although the above heat-resistant transparent container developed by the applicant is very favorable which has high heat resistance and high transparency, it is not sufficient in terms of ability to keep quality of foods. In addition, its resistance to dropping is also required to be improved.

SUMMARY OF THE INVENTION

It is an object of the invention to provide a multilayer container having high transparency and high heat resistance, and moreover, having excellent keeping quality of foods and improved resistance to dropping.

The inventors investigated eagerly in order to solve the above problems and found that a container having good keeping quality of foods and resistance to dropping in addition to high heat resistance and high transparency, can be produced from a multilayer sheet comprising a A-PET layer, a functional resin layer, such as having oxygen gas barrier ability or resistance to dropping by the following primary stretching and heat-setting process and secondary stretching and heat-setting process.

Thus, this invention provides a method of making a multilayer container which comprises a primary stretching and heat-setting process wherein a multilayer sheet comprising a A-PET layer, a functional resin layer and a sealant layer, is heated, primarily stretched and then primarily heat-set, and a secondary stretching and heat-setting process wherein the multilayer sheet treated in the primary stretching and heat-setting process is molded with heating by a mold of a thermoforming machine while secondary stretching is performed, followed by secondary heat-setting in the same mold.

In another aspect of the invention, the above functional resin layer is composed of one or more layers which are an oxygen barrier layer selected from the group consisting of ethylene-vinyl alcohol copolymer (EVOH) resin layer, polyvinylidene chloride (PVDC) resin layer, polyacrylonitrile (PAN) resin layer and methaxylilenediamine 6-nylon (MXD6-NY) resin layer, and/or resistance to dropping resin layer being nylon (NY) resin layer.

In another aspect of the invention, the above primary stretching and heat-setting process is carried out uniaxial stretching using rolls as the stretching apparatus at a stretching temperature of 90 to 120° C. at a draw ratio of 2 to 4 times in the MD (longitudinal) direction, and then primary heat-setting at a temperature higher than the stretching temperature by 5 to 20° C.

In another aspect of the invention, in the primary stretched multilayer sheet prepared through the primary stretching and heat-setting process, the A-PET layer has a crystallinity of 20% or more as shown in the following formula:

$$\text{crystallinity}(\%) = \frac{\left(\begin{array}{c}\text{quantity of heat of}\\ \text{fusion per mole}\end{array}\right) - \left(\begin{array}{c}\text{quantity of heat of cold}\\ \text{crystallization per mole}\end{array}\right)}{\text{quantity of heat of fusion of perfect crystal } PET \text{ per mole (26.9 kj)}} \times 100$$

In another aspect of the invention, in the secondary stretching and heat-setting process, the multilayer sheet is molded with heating at a temperature of 80 to 130° C., and secondary heat-set in the same mold at a temperature of 20 to 200° C.

In still another aspect of the invention, in the multilayer container prepared through the secondary stretching and heat-setting process, the A-PET layer has a crystallinity of 25% or more as shown in the following formula:

$$\text{crystallinity}(\%) = \frac{\binom{\text{quantity of heat of}}{\text{fusion per mole}} - \binom{\text{quantity of heat of cold}}{\text{crystallization per mole}}}{\text{quantity of heat of fusion of perfect crystal } PET \text{ per mole } (26.9 \text{ kj})} \times 100$$

In the invention, in the primary stretching and heat-setting process, crystallinity of A-PET sheet is raised within the range capable of thermoforming, and in the secondary stretching and heat-setting process, the sheet treated in the primary stretching and heat-setting process is molded into a shape of container and crystallinity is further raised to improve heat resistance to render the container to resist a temperature at 125° C. or higher. Moreover, since a functional resin layer is laminated, oxygen barrier ability, resistance to dropping or the like can be ensured by employing a resin layer having oxygen barrier ability, resistance to dropping or the like.

That is, the multilayer container of the invention is a food container having good keeping quality of foods and applicability in a wide temperature range from cold-storage foods to retort foods. Rigidity and heat resistance are imparted by stretching to raise crystallinity with keeping excellent transparency and gloss of A-PET. Furthermore, heat resistance can be freely controlled by raising crystallinity by controlling the mold temperature and time in the secondary heat-setting.

In the first aspect of the invention, since the aforementioned functional resin layer is composed of one or more resin layers which are an oxygen barrier layer selected from the group consisting of EVOH resin layer, PVDC resin layer, PAN resin layer and MXD6-NY resin layer, and/or a resistance to dropping resin layer being NY resin layer, the multilayer container has either or both of very high oxygen gas barrier ability and resistance to dropping.

In the second aspect of the invention, since the stretched multilayer sheet is formed by uniaxial stretching at a stretching temperature of 90 to 120° C. at a draw ratio of 2 to 4 times in the MD direction, and then primarily heat-set at a temperature higher than the stretching temperature by 5 to 20° C., crystallinity of the A-PET layer can be controlled to 20% or more but less than 30% with keeping good transparency. In addition, it can be manufactured cheaply by a simple equipment of rolls.

In the third aspect of the invention, by rendering the crystallinity of the stretched A-PET sheet in the uniaxially stretched multilayer sheet 20% or more shown by the previous formula which is thermoformable crystallinity, the crystallinity can be rendered 30% or more, which achieves high heat-resistance, in the secondary stretching and heat-setting process.

In the fourth aspect of the invention, by molding the uniaxially stretched multilayer sheet with heating at a temperature of 80 to 130° C. to achieve secondary stretching, followed by secondary heat-setting in the same mold at a temperature of 20 to 200° C., the crystallinity of the A-PET layer can be made 25% or more by the crystallization caused by orientation and the crystallization caused by heat-setting, with keeping transparency.

In the fifth aspect of the invention, by rendering the crystallinity of the A-PET layer in the multilayer container formed through the secondary stretching and heat-setting process 25% or more shown by the previous formula, high heat-resistance can be imparted with keeping high transparency.

Figure 1:
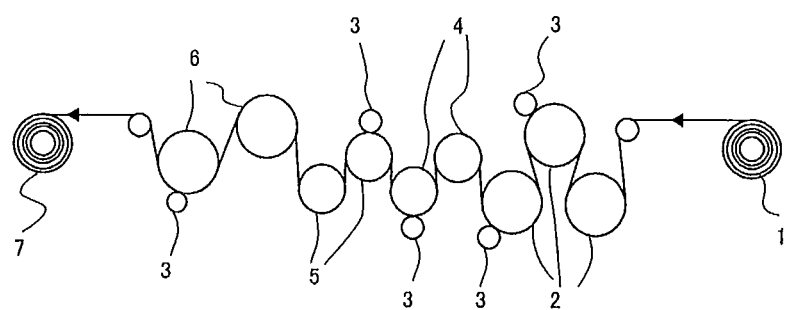
FIG. 1 is a schematic illustration of an apparatus for manufacturing a uniaxially stretched multilayer sheet.

1 . . . Multilayer sheet
2 . . . Preheating roll
3 . . . Nip roll
4 . . . Heating roll
5 . . . Stretching roll
6 . . . Heat-setting roll
7 . . . Longitudinally uniaxially stretched multilayer sheet
11 . . . Upper heating plate
12 . . . Lower heating plate
13 . . . Upper mold
14 . . . Lower mold
15 . . . Embedded heater
16 . . . Thermoformed article

DETAILED DESCRIPTION OF THE INVENTION

The multilayer container of the invention is formed from a multilayer sheet having a layer construction A-PET layer/functional resin layer/sealant layer, through a primary stretching and heat-setting process wherein the multilayer sheet is heated, primarily stretched and then primarily heat-set, and a secondary stretching and heat-setting process wherein the primarily stretched multilayer sheet is molded with heating in a mold with heating in a mold of a thermoforming machine while secondary stretching is performed, followed by secondary heat-setting in the same mold.

The amorphous polyethylene terephthalate (A-PET) layer bears form keeping ability as container, and imparts heat resistance and rigidity. The A-PET layer is fundamentally in non- or slight crystalline state having a crystallinity of approximately 5 to 7%. A typical thickness of the A-PET layer is 100 to 600 μm, particularly 150 to 500 μm.

The functional resin layer is for imparting necessary functions as food container, and specifically, to impart oxygen barrier ability, resistance to dropping and the like. Preferable layers for imparting oxygen barrier ability are EVOH resin layer, PVDC resin layer, PAN resin layer, MXD6-NY resin layer, and a preferable layer for imparting resistance to dropping is NY resin layer which resist tearing and flexing. The resistance to dropping means resistance to breakage upon dropped. The functional resin layer may be a single layer or multilayer, and for example, a combination of an oxygen barrier layer and a resistance to dropping layer. A typical thickness of the functional resin layer is 15 to 150 μm, particularly 30 to 100 μm.

The sealant layer bears a role of sealing container by heat-sealing between the container body and a cover. Since the sealant layer is positioned as the innermost layer, resins having excellent food safety and keeping quality of foods are used, such as polypropylene (PP), polyethylene (PE) and LLDPE resins. PP resin is suitable for containers for retort foods, and PE resin and LLDPE resin are suitable for cold-storage foods and foods to be boiled. A typical thickness of the sealant layer is 30 to 300 μm, particularly 40 to 200 μm.

The total thickness of the multilayer sheet is typically 150 to 1000 μm, particularly 250 to 800 μm.

The multilayer sheet having a layer construction of A-PET layer/functional resin layer can be formed by dry lamination of respective sheets or films in a layer construction of A-PET layer/adhesive agent/functional resin layer/adhesive agent/ sealant layer. Alternatively, the multilayer sheet is formed by coextrusion inflation process or coextrusion T-die process in a layer construction of A-PET layer/adhesive resin/functional resin layer/adhesive resin/sealant layer. The adhesive resin must have adhesiveness to both layers to be bonded, and can be chosen from maleic anhydride graft polymerized PP or PE resin, ethylene-methyl acrylate copolymer (EMA), EVA and the like.

The multilayer sheet is, in the primary stretching and heat-setting process, uniaxially stretched, and then, primarily heat-set.

A suitable stretching temperature (surface temperature of the multilayer sheet) in the primary stretching is in the range from 90 to 120° C., preferably 95 to 110° C. When the stretching temperature is lower than 90° C., tension loaded is great while stretching the multilayer sheet, and thickness of stretched multilayer sheet tends to be not uniform caused by uneven stretching. When the stretching temperature exceeds 120° C., the sheet is whitened and surface roughening also occurs.

A suitable draw ratio is 2 to 4 times, preferably 2.2 to 3.5 times. When the draw ratio is less than twice, cold crystallization point is observed in the measurement of the A-PET layer by a differential scanning calorimeter (DSC). Crystallinity becomes less than 20%. A relationship between the draw ratio and the crystallinity is approximately shown in Table 1.

TABLE 1

| | Draw Ratio (times) | | | | | |
|---|---|---|---|---|---|---|
| | 2.0 | 2.2 | 2.4 | 2.6 | 2.8 | 3.0 |
| Crystallinity (%) | 21.8 | 23.6 | 25.6 | 26.7 | 27.7 | 29.0 |

As can be seen from the above results, when the draw ratio is 2.3 times or less. The secondary heat-setting at a temperature of 130 to 200° C. is necessary. However, when the draw ratio is 2.4 times or more, since the crystallinity exceeds 25%, the above secondary heat-setting is optional.

A typical stretching apparatus is a uniaxial stretching apparatus using heating rolls, which may be single step stretching in a short range or multiple step stretching of two or more steps.

The primary heat-setting temperature is not specifically limited, but in view of relaxation of orientation by annealing, a preferred temperature is higher than the stretching temperature by 5 to 20° C. When the heat-setting temperature is lower than the above range, i.e., not higher than the stretching temperature plus 5° C., heat shrinkage of the sheet is great. When the heat-setting temperature is higher than the above range, i.e., exceeding the stretching temperature plus 20° C., surface roughening occurs on the surface of the A-PET layer to be slightly whitened. In the above range of heat-setting temperature, preferable heat-setting temperature is higher, because of reducing the rate of heat shrinkage of the primarily stretched multilayer sheet, and reducing deformation upon forming the thermoformed article. The heat-setting time is usually 1 to 6 seconds, preferably 2 to 5 seconds. In order to meet the relaxation of orientation of the sheet, rotational speed of heat-setting roll is made slower than the stretching roll by about 0.5 to 10%.

In the primarily stretched multilayer sheet prepared through the primary stretching and heat-setting process, it is preferable that the A-PET layer has a crystallinity of 20% or more shown by the following formula:

$$\text{crystallinity}(\%) = \frac{\left(\begin{array}{c}\text{quantity of heat of}\\ \text{fusion per mole}\end{array}\right) - \left(\begin{array}{c}\text{quantity of heat of cold}\\ \text{crystallization per mole}\end{array}\right)}{\begin{array}{c}\text{quantity of heat of fusion of perfect}\\ \text{crystal PET per mole (26.9 kj)}\end{array}} \times 100$$

When the crystallinity is less than 20%, it is difficult to render the crystallinity 30% or more even through the secondary stretching process.

Subsequently, the primarily stretched multilayer sheet manufactured through the above primary stretching and heat-setting is heated to between 80 to 130° C., molded by a mold of thermoforming machine while secondary stretching is performed, followed by secondary heat-setting in the same mold. The secondary heat-setting temperature is 20 to 70° C. for the containers not requiring heat resistance because of being not necessary to raise crystallinity of the containers, or 130 to 200° C. for the containers requiring heat resistance where crystallinity can be raised. The heat-setting time in the mold is 2 seconds or more, preferably 3 seconds or more.

Figure 3:
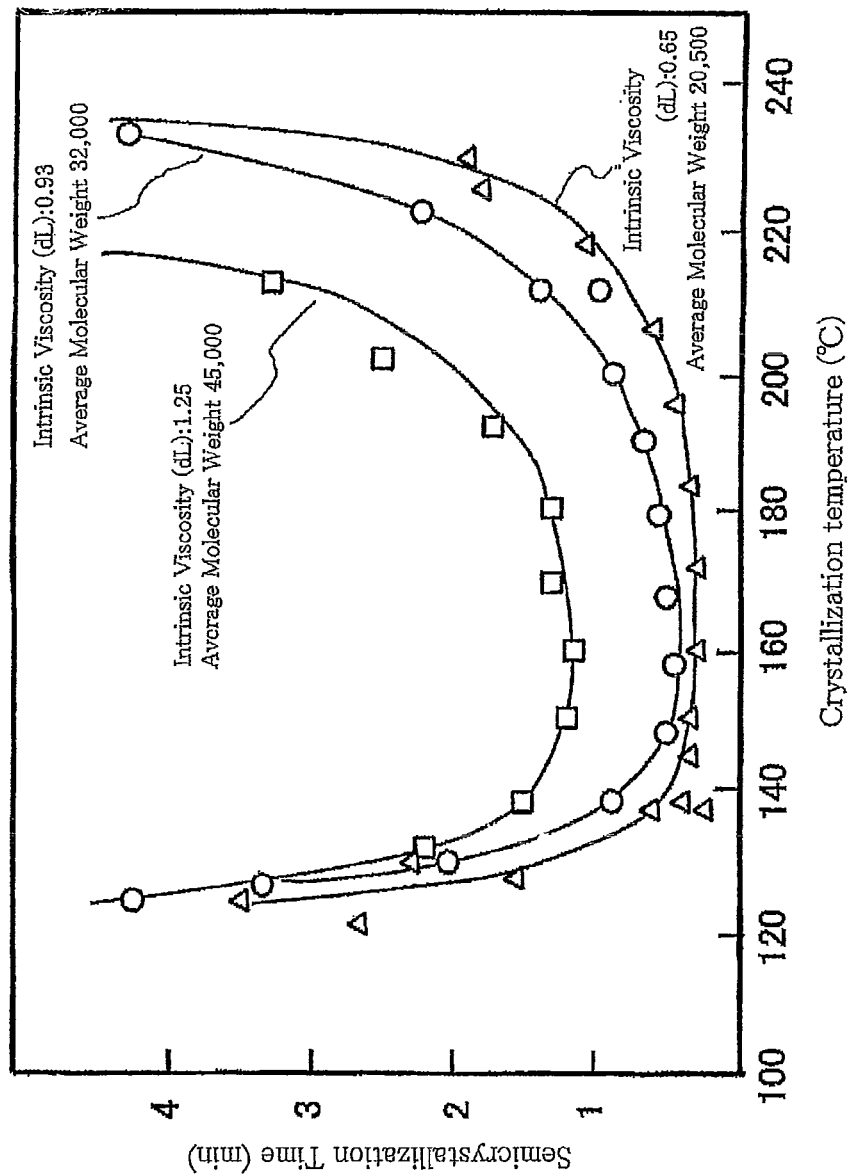
FIG. 3 is a graph showing a relationship between temperature and crystallization time.

FIG. 3 indicates crystallization speed (insoluble catalyst), and ordinate represents semicrystallization time and abscissa represents crystallization temperature. The semicrystallization time is the time (minute) until reaching 50% crystallization while keeping the temperature constant. The crystallization temperature is the temperature where crystallization occurs. In general, optimum crystallization temperature is important which is from about 130° C. to about 200° C. for PET resin. The crystallization degree can be measured by the density-gradient sedimentation method or the DSC method. In the former method, the crystallization degree is calculated by that the density of 1.335 is 0% and that of 1.501 is 100%. In the DSC (differential scanning calorimeter) method, 10 mg of a sample is heated to elevate the temperature, for example, from 20° C. to 300° C. at a temperature elevation rate of 10° C./min, while nitrogen gas flows at a rate of 50 ml/min., and quantity of heat is determined from the DSC chart (thermogram), and the crystallization is calculated from the quantity of heat.

From the figure, it can be seen that optimum crystallization temperature range is 130 to 200° C., preferably 140 to 190° C., more preferably 150 to 180° C. That is, when the crystallization temperature is lower than 130° C., degree of freedom of molecules is small, and when higher than 200° C., driving force against crystallization is small, to lower crystallization speed.

The forming method is not critical, and may be either vacuum molding, pressure forming or vacuum-pressure forming.

It is preferable that the A-PET layer of the multilayer container thus manufactured has a crystallinity of 25% or more. The crystallinity is as indicated in the previous formula.

A process for manufacturing the multilayer container according to the invention will be explained with reference to drawings.

In FIG. 1, multilayer sheet 1 is delivered from its storage roll, and preheated to 70 to 90° C. while passing preheating rolls 2 nipped by nip rolls 3. Then, the sheet 1 is further heated to 90 to 120° C. by heating rolls 4 nipped by nip rolls 3, and stretched 2 to 4 times by stretching rolls 5 in the longitudinal direction. The uniaxially stretched multilayer sheet 1 is heated by heat-setting rolls 6 to a temperature higher than the temperature heated by heating rolls 4 by 5 to 20° C. to be heat-set to complete a longitudinally uniaxially stretched multilayer sheet 7.

Figure 2:
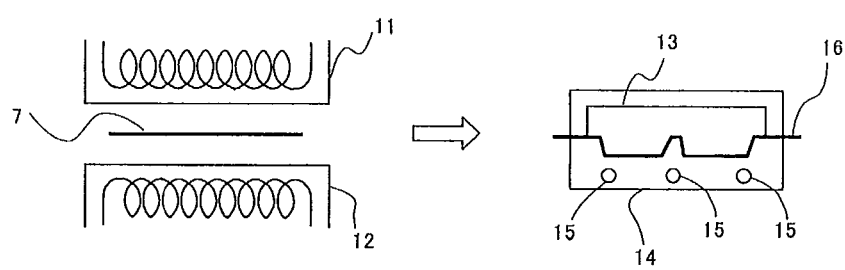
FIG. 2 is a schematic illustration of a thermoforming apparatus.

As shown in FIG. 2, the longitudinally uniaxially stretched multilayer sheet 7 is located between upper heating plate 11 and lower heating plate 12 to be heated to 80 to 130° C. as the surface temperature of the sheet, and thermoformed by pressing by upper mold 13 and lower mold 14. The thermoformed sheet is kept for 5 seconds in the pressed state, and then, taken out. Since lower mold 14 is heated by embedded heaters 15 to 200° C. or more, the thermoformed article 16 is heat-set at 20 to 200° C.

EXAMPLES

Example 1

A form types five layers coextruder composed of a main extruder (90 μmΦ) and three sub-extruders (50 μmΦ) (manufactured by Modern Machinery Co., Ltd.) was used. PET resin was charged into the main extruder, and EVOH resin ("H101", manufactured by Kuraray Co., Ltd.), LLDPE resin ("UF945", manufactured by Japan Polyethylene Corp.), and adhesive resin ("ADTEX DU8500", manufactured by Japan Polyethylene Corp.) were charged into three sub-extruders, respectively. Then these resins were extruded at a temperature of 270° C. for the main extruder and at 260° C. for three sub-extruders to produce a coextruded multilayer sheet having a layer construction of PET (250 μm)/adhesive resin (10 μm)/EVOH (15 μm)/adhesive resin (10 μm)/LLDPE (75 μm).

Subsequently, the multilayer sheet was stretched by a roll type uniaxially stretching machine ("T-17" type, manufactured by NIPPON SEIKO SHO, Ltd.). The stretching conditions were set the preheating roll temperature at 80° C., the heating roll temperature (stretching temperature) at 95° C., the stretching roll temperature at 80° C. and the heat-setting roll temperature at 100° C. The multilayer sheet was delivered at a speed of 10 m/min., and stretched 2.5 times by one step by the stretching rolls 5. The stretched sheet was heat-set for 3.0 seconds while passing through the heat-setting rolls 6 to obtain a stretched multilayer sheet 144 μm thick.

The primarily stretched multilayer sheet was transparent and no wrinkle. The A-PET layer was separated, and the crystallinity was determined by a differential scanning calorimeter (DSC) to be found 26.0%, and no cold crystallization peak was observed.

<Crystallinity>

Melting behavior of the primarily stretched A-PET sheet was measured by a differential scanning calorimeter ("DSC 220", Seiko Denshi). In the measurement, a 10 mg sample was heated at a temperature elevation speed of 10° C./min from 20° C. to 300° C. under nitrogen gas flow at 50 ml/min. The crystallinity was calculated by the following formula:

$$\text{crystallinity}(\%) = \frac{\left(\begin{array}{c}\text{quantity of heat of}\\ \text{fusion per mole}\end{array}\right) - \left(\begin{array}{c}\text{quantity of heat of cold}\\ \text{crystallization per mole}\end{array}\right)}{\text{quantity of heat of fusion of perfect crystal PET per mole (26.9 kj)}} \times 100$$

Subsequently, the primarily stretched multilayer sheet was formed into containers (box shaped with round corners; major axis:15 cm×minor axis:11 cm×depth:3 cm) and sliced ham was packed therein, followed by heat-sealing with O-NY (15 μm)/LLDPE (40 μm) film as the cover by a thermoforming packing machine ("Multi Pack R535", made in Germany and sold by Japan Food Machinery Co., Ltd.) with a heating plate temperature at 100° C. and a mold temperature at room temperature. The forming was carried out to reproduce the prescribed form, and forming speed was satisfactory, 10 shots/min.

<Evaluation of Oxygen Barrier Ability>

The oxygen barrier ability was measured by an oxygen permeability meter ("OX-TRAN, Model 2/21" (registered trademark) manufactured by MOCON Co.) at 30° C. at a humidity of 80% RH. The measured result was 1.3 ml/m²·D·atm which is enough for keeping quality of foods at ordinary temperature.

<Evaluation of Heat Resistance>

The containers were immersed in hot water, and deformed or not was observed. As a result, no deformed container was found until 85° C. to confirm the heat resistance up to 85° C. Although the unstretched A-PET has a heat resistance up to 70° C., it can resist short boiling sterilization. In addition, thinning of the PET layer is possible.

<Measurement of Crystallinity>

The A-PET layer of the container was separated, and its crystallinity was measured by DSC, and found to be 26.8%. Since the temperature of the mold was room temperature which is much lower than the optimum crystallization temperature of 130 to 200° C. shown in FIG. 3, crystallization by heat was little, and only slightly proceeded by the orientation crystallization occurring in the secondary stretching in the forming.

Example 2

Using the same form types five layers coextruder as Example 1, the same PET resin as Example 1 was charged into the main extruder, and PVDC resin (manufactured by Asahi Chemical Industries, Co., Ltd.), PP resin ("PM 731M", manufactured by Sun-Allomer Ltd.) and adhesive resin ("Modic APP 565", manufactured by Mitsubishi Chemical Corporation) were charged into three sub-extruders, respectively. Then, these resins were extruded at a temperature of 270° C. for the main extruder and at 260° C. for three sub-extruders to produce a coextruded multilayer sheet having a layer construction of PET (500 μm)/adhesive resin (10 μm)/PVDC (25 μm)/adhesive resin (10 μm)/PP (100 μm).

The manufactured multilayer sheet was stretched 2.5 times and then heat-set in the same manner as Example 1 to obtain a primarily stretched multilayer sheet 258 μm shick. The primarily stretched multilayer sheet was transparent and no wrinkle. The A-PET layer was separated, and the crystallinity was determined by DSC to be found 25%, and no cold crystallization peak was observed.

Subsequently, the primarily stretched multilayer sheet was heated by heaters so that the surface temperature became 90° C. The softened stretched multilayer sheet was molded by vacuum-pressure forming using a vacuum-pressure forming machine ("FKC" type, manufactured by Asano Laboraatories, Ltd.) at an air pressure of 0.5 MPa. The served mold was a cavity type aluminum mold having an upper diameter of 100 mm, a bottom diameter of 80 mm and a depth of 35 mm, and the temperature of the aluminum mold was set at 140° C., within the optimum crystallization temperature range for PET resin. The heat-setting time while the mold was closed was 5 seconds.

The thermoformed article kept the transparency of the stretched A-PET sheet, and had a shape in accordance with the mold without deformation.

<Measurement of Crystallinity>

The A-PET layer of the container was separated, and its crystallinity was measured by DSC, and found to be 36.5%.

<Evaluation of Heat Resistance>

The container was filled up with water, and sealed by heat-sealing with a cover having a layer construction of PET (12 μm)/O-NY (15 μm)/easy peeling (35 μm). Then, retort sterilization was carried out using a hot water·static type retort with a time schedule of temperature elevation for 10 minutes-standing at 125° C. for 30 minutes-cooling for 15 minutes. After the retort sterilization, the container was not deformed, and whitening did not occur. Thus, the container has a heat resistance to 125° C.

<Evaluation of Oxygen Barrier Ability>

The container which had been subjected to retort sterilization was opened, and water was taken out, followed by drying. Then, the oxygen barrier ability was evaluated similar to Example 1, and found to be 1.6 ml/m$^2$·D·atm, which is enough for keeping quality of foods.

The invention claimed is:

1. A method of making a multilayer container which comprises:
    a primary stretching and heat-setting process wherein a multilayer sheet having a total thickness of 150 to 1000 μm and consisting essentially of an A-PET layer having a thickness of 100 to 600 μm, a functional resin layer and a sealant layer, is heated, primarily stretched and then primarily heat-set, and
    a secondary stretching and heat-setting process wherein the multilayer sheet treated in the primary stretching and heat-setting process is molded with heating by a mold of a thermoforming machine while secondary stretching is performed, followed by secondary heat-setting in the same mold,
    wherein the functional resin layer is composed of one or more layers which are an oxygen barrier layer selected from the group consisting of EVOH resin layer, PVDC resin layer, PAN resin layer and MXD6-NY resin layer, and/or resistance to dropping resin layer being NY resin layer,
    wherein the multilayer sheet is, in the primary stretching and heat-setting process, uniaxially stretched using rolls as the stretching apparatus at a stretching temperature of 90 to 120° C. at a draw ratio of 2 to 4 times in the MD (longitudinal) direction, and then primarily heat-set at a temperature higher than the stretching temperature by 5 to 20° C.,
    wherein, in the secondary stretching and heat-setting process, the multilayer sheet is molded with heating at a temperature of 80 to 130° C., and the secondary heat-setting in the same mold consists of the step of heat-setting at a temperature of 20 to 70° C., and
    wherein the sealant layer is selected from the group consisting of polypropylene, polyethylene and LLDPE.

2. The method of claim 1, wherein in the primary stretched multilayer sheet prepared through the primary stretching and heat-setting process, the A-PET layer has a crystallinity of 20% or more as shown in the following formula:

$$\text{crystallinity}(\%) = \frac{\left(\begin{array}{c}\text{quantity of heat of}\\\text{fusion per mole}\end{array}\right) - \left(\begin{array}{c}\text{quantity of heat of cold}\\\text{crystallization per mole}\end{array}\right)}{\text{quantity of heat of fusion of perfect crystal } PET \text{ per mole (26.9 kj)}} \times 100.$$

3. The method of claim 1, wherein in the multilayer container prepared through the secondary stretching and heat-setting process, the A-PET layer has a crystallinity of 25% or more as shown in the following formula:

$$\text{crystallinity}(\%) = \frac{\left(\begin{array}{c}\text{quantity of heat of}\\\text{fusion per mole}\end{array}\right) - \left(\begin{array}{c}\text{quantity of heat of cold}\\\text{crystallization per mole}\end{array}\right)}{\text{quantity of heat of fusion of perfect crystal } PET \text{ per mole (26.9 kj)}} \times 100.$$

4. The method of claim 1, wherein the draw ratio in the primary stretching and heat-setting process is 2.4 to 4 times.

* * * * *